(12) United States Patent
Kurisaki et al.

(10) Patent No.: US 6,602,604 B2
(45) Date of Patent: Aug. 5, 2003

(54) COATING COMPOSITION

(75) Inventors: Minoru Kurisaki, Shizuoka (JP); Takamasa Harada, Tokyo (JP); Katsuyuki Sakamoto, Tokyo (JP); Junichi Fukuzawa, Tokyo (JP)

(73) Assignee: Clariant Finance (BVI) Limited, Tortola (VG)

( * ) Notice: Subject to any disclaimer, the term of this patent is extended or adjusted under 35 U.S.C. 154(b) by 0 days.

(21) Appl. No.: 09/914,561

(22) PCT Filed: Dec. 22, 2000

(86) PCT No.: PCT/JP00/09156
§ 371 (c)(1), (2), (4) Date: Aug. 27, 2001

(87) PCT Pub. No.: WO01/48108
PCT Pub. Date: Jul. 5, 2001

(65) Prior Publication Data
US 2002/0182417 A1 Dec. 5, 2002

(30) Foreign Application Priority Data
Dec. 27, 1999 (JP) ............................................. 11-370428

(51) Int. Cl.⁷ ................................................. B32B 27/38
(52) U.S. Cl. ........................ 428/413; 428/417; 428/447; 525/100; 525/102; 525/119; 525/117
(58) Field of Search ................................. 428/413, 417, 428/447; 525/100, 102, 107, 119; 11/11

(56) References Cited

U.S. PATENT DOCUMENTS 6,410,206 B1 * 6/2002 Ueda et al. .............. 430/280.1

OTHER PUBLICATIONS

English abstract for JP 8027348, Jan. 30, 1996 (for laidopen publication No. 27348/1996 that is referenced in U.S. patent application).

* cited by examiner

Primary Examiner—Robert Dawson
Assistant Examiner—Christopher M. Keehan
(74) Attorney, Agent, or Firm—Alan Kass

(57) ABSTRACT

The present invention is to provide a coating composition capable of forming a protective film excellent in adhesion properties. Such a coating composition comprises a specific polymer containing carboxyl group, a specific multifunctional epoxide-containing compound having two or more epoxy groups, an organic solvent, and an amino-containing silane coupling agent represented by the following general formula (I):

$$H_2N-R^1-Si-(OR^2)_3 \qquad (I)$$

wherein, $R^1$ is an unsubstituted alkylene group, and $R^2$'s are independently an unsubstituted alkyl group.

8 Claims, No Drawings

COATING COMPOSITION

This application claims benefit under 35 U.S.C. §371 of PCT/JP00/09156, filed Dec. 22, 2000.

BACKGROUND OF THE INVENTION

1. Field of the Invention

The present invention relates to coating compositions useful for the formation of protective films, capable of providing smooth and transparent surfaces. More particularly, the present invention relates to coating compositions for forming protective films on color filters laid over glass or transparent materials.

2. Background Art

In recent years, liquid crystal display elements have been extensively used in audiovisual equipment, and electronic equipment such as personal computers. In particular, the demand for color displays is now rapidly increasing since they are excellent in visibility and amount of information. To produce color displays, color filters in the shape of mosaic, stripes, or the like are usually formed on transparent substrates such as glass by a dyeing, printing, pigment dispersing or electrode position process, or the like.

In general, these color filters are produced so that their thickness will be approximately 1 micron, where it is inevitable that the color filters have surface roughness in the submicron range. In color STN displays, this roughness affects the quality of display (unevenness in color, etc.). In order to eliminate unevenness in display, it is necessary to control the surface roughness of the color filters to 0.1 microns or less. To obtain such smooth surfaces, thermosetting acrylic resins have conventionally been applied to the surfaces of the color filters.

Not only in liquid crystal display elements but also in charge coupled devices (CCD), their color filters require surface protection. Protective films are thus needed to protect the color filters from severe conditions under which post-treatments are conducted, for example, from solvents, acidic or alkaline solutions, etc. that are used for dipping treatment, and from high-temperature heat that is generated while electrode layers are formed by sputtering. Such protective films are required to be smooth, strong, and excellent in transparency. They are also required to be excellent in resistance to heat and chemicals so that they will undergo no change in color and quality for a long period of time. To meet these requirements, thermosetting resins including epoxy copolymers have so far been used.

Many conventionally known coating compositions for forming protective films are of two-bottle type. In the case of two-bottle-type coating compositions, it is necessary to mix two liquids before use, and, once they are mixed, it is desirable to use the mixture immediately. In addition, the coating compositions can, depending on their compositions, produce sublimates while they are curing. These sublimates crystallize to give foreign particles, which can cause troubles during the production of liquid crystal panels. There have therefore been demanded coating compositions that never give crystallized materials.

Japanese Patent Laid-Open Publication No. 27348/1996, for instance, describes a coating composition useful for the formation of protective films suitable for the aforementioned purpose. This composition is a coating resin composition comprising (A) a copolymer resin containing (1) 10% by weight or more and less than 30% by weight of a methacrylic or acrylic acid ester in which an alicyclic group having 7 to 20 carbon atoms, containing tertiary carbon in its ring is attached to ester group, and (2) more than 60% by weight and 90% by weight or less of glycidyl methacrylate or acrylate, and (B) a copolymer resin containing, as essential components, (a) N-substituted maleimide and (b) acrylic or methacrylic acid. In this publication, it is suggested that a coupling agent having epoxy group be introduced to the coating composition in order to improve adhesion, a property essential for coating compositions. However, according to our investigations, there was still room for improvement in reliability in terms of the peeling of films of the coating composition.

SUMMARY OF THE INVENTION

We now found that coating compositions having high storage stability, capable of forming films excellent not only in transparency, smoothness, and resistance to sputtering, but also in adhesion, which is a property particularly important for coating compositions to be used to form protective films, can be obtained when specific polymers and specific additives are used in combination. The present invention was accomplished on the basis of this finding.

An object of the present invention is therefore to provide coating compositions that are essentially stable and that can form excellent protective films.

More specifically, an object of the present invention is to provide coating compositions having storage stability equal to or better than that of conventional coating compositions, capable of forming films having not only transparency, smoothness and sputtering resistance equal to or more excellent than those of films of conventional coating compositions, but also excellent adhesion properties.

A coating composition according to the present invention comprises:

(A) at least one polymer containing carboxyl group, having a weight-average molecular weight, as calculated in terms of styrene, of 5,000 to 200,000, an acid value KOH of 10 to 300 mg/g, and a glass transition temperature of 50 to 250° C., (B) as a crosslinking agent, a multifunctional epoxide-containing compound having at least one benzene ring or heterocycle, and two or more epoxy groups, (C) an organic solvent, and (D) at least one amino-containing silane coupling agent represented by the following general formula (I):

$$H_2N-R^1-Si-(OR^2)_3 \qquad (I)$$

wherein, $R^1$ is an unsubstituted alkylene group, and $R^2$'s are independently an unsubstituted alkyl group.

DETAILED DESCRIPTION OF THE INVENTION

A coating composition according to the present invention basically contains (A) a polymer, (B) a crosslinking agent, (C) an organic solvent, and (D) an amino-containing silane coupling agent.

Polymer

In the present invention, the polymer (A) is defined as a polymer containing carboxyl group, having a weight-average molecular weight, as calculated in terms of styrene, of 5,000 to 200,000, an acid value KOH of 10 to 300 mg/g, and a glass transition temperature of 50 to 250° C. In a preferred embodiment of the present invention, the polymer has a weight-average molecular weight of approximately 10,000 to 100,000, and an acid value KOH of about 30 to 100 mg/g.

Preferable examples of such polymers are copolymers of compounds selected from acrylic acid, methacrylic acid, and esters thereof, and aromatic vinyl compounds. Examples of compounds selected from acrylic acid, methacrylic acid, and esters thereof include methyl acrylate, methyl methacrylate, ethyl acrylate, ethyl methacrylate, butyl acrylate, butyl methacrylate, ethylhexyl methacrylate, and phenyl acrylate. Examples of aromatic vinyl compounds include styrene, α-methylstyrene and p-methyl-styrene.

These copolymers may be of any type; they may be any of random copolymers produced by addition polymerization, block copolymers, and the like. Further, there is no particular limitation on the copolymerization process, and any one of the solution polymerization process, the emulsion polymerization process and the like can be adopted to produce the copolymers. In the present invention, the amount of the polymer to be used may be properly determined within such a range that the resulting coating composition can form excellent protective films. It is however preferable to use the polymer in an amount of approximately 5 to 30% by weight, more preferably about 10 to 25% by weight of the coating composition.

Crosslinking Agent

In the present invention, the crosslinking agent is a multifunctional epoxide-containing compound having, in one molecule, at least one benzene ring or heterocycle, and two or more epoxy groups. In one embodiment of the present invention, the epoxide-containing compound is preferably one having phenyl group and cyclohexyl group, more preferably one having two or more phenyl groups.

In a preferred embodiment of the present invention, the epoxide-containing compound has three or more epoxy functional groups.

Specific examples of the crosslinking agent include bisphenol acetone diglycidyl ether, phenol novolak epoxy resins, cresol novolak epoxy resins, triglycidyl isocyanurate, tetraglycidyldiaminodiphenylene, tetraglycidyl-m-xylenediamine, tetraglycidyl-1,3-bis (aminoethyl) cyclohexane, tetraphenyl-glycidyl ether ethane, triphenylglycidyl ether ethane, bisphenol hexafluoro-acetodiglycidyl ether, 1,3-bis(1-(2,3-epoxypropoxy)-1-trifluoromethyl-2,2, 2-trifluoromethyl)benzene, 4,4-bis(2,3-epoxypropoxy) octafluorobiphenyl, triglycidyl-p-aminophenol, tetraglycidyl-m-xylenediamine, 2-(4-(2,3-epoxy-propoxy) phenyl)-2-(4-(1,1-bis(4-(2,3-epoxypropoxy)phenyl)ethyl) phenyl)-propane, and 1,3-bis(4-(1-(4-(2,3-epoxypropoxy) phenyl)-1-(4-(1-(4-(2,3-epoxy-propoxyphenyl)-1-methylethyl)phenyl)ethyl)phenoxy)-2-propanol.

In the present invention, the crosslinking agent may be used in any amount. It is however preferable to use the crosslinking agent in an amount of approximately 1 to 50 parts by weight, more preferably 10 to 40 parts by weight for 100 parts by weight of the polymer.

It is noted that, in the coating composition of the present invention, it is also possible to use, instead of the above-described polymer (A) and crosslinking agent (B), a polymer containing both carboxyl group and epoxy group, having a weight-average molecular weight, as calculated in terms of styrene, of 5,000 to 200,000, an acid value KOH of 10 to 300 mg/g, and a glass transition temperature of 50 to 250° C. Such a multifunctional polymer itself has the function of a crosslinking agent. Therefore, when a polymer of this type is used, the polymer (A) and crosslinking agent (B) are to exist in the coating composition as a single component.

Solvent

In the present invention, an organic solvent is used to dissolve therein the above-described polymer and crosslinking agent. In a preferred embodiment of the present invention, the organic solvent is selected from the group consisting of propylene glycol-based, ethylene glycol-based, lactate-based, butyrate-based, acetate-based, formate-based and γ-butyrolactone solvents, and mixtures thereof. When any of these organic solvents is used, the resulting coating composition is stable over approximately 6 months after preparation, and provides a uniform coating film having no unevenness in coating. It is thus possible to obtain protective films that are excellent in adhesion, smoothness, transparency, durability, and resistance to abrasion, stains and chemicals.

Specific examples of the organic solvent for use in the present invention include glycol ether and acetate-based solvents such as propylene glycol methyl ether, propylene glycol ethyl ether, propylene glycol propyl ether, propylene glycol t-butyl ether, dipropylene glycol methyl ether, dipropylene glycol propyl ether, tripropylene glycol methyl ether, propylene glycol methyl ether acetate, dipropylene glycol methyl ether acetate, ethylene glycol ethyl ether, ethylene glycol methyl ether, ethylene glycol butyl ether, ethylene glycol isopropyl ether, ethylene glycol n-butyl ether, cellosolve acetate, methyl cellosolve acetate, ethyl cellosolve acetate, diethylene glycol methyl ether, diethylene glycol ethyl ether, diethylene glycol butyl ether, diethylene glycol dimethyl ether, diethylene glycol diethyl ether, diethylene glycol monoacetate, diethylene glycol monoethyl ether acetate, propylene glycol phenyl ether, propylene glycol ethyl ether acetate, triethylene glycol butyl ether, 3-methyl-3-methoxybutyl acetate, and 3-methyl-3-methoxybutanol; lactate-based solvents such as ethyl lactate, methyl lactate, butyl lactate and pentyl lactate; acetate-based solvents such as butyl acetate, amyl formate, isoamyl acetate, isobutyl acetate, methoxybutyl acetate, and butyl propionate; and butyrate-based solvents such as isobutyl butyrate, butyl butyrate and ethyl pyruvate.

In a preferred embodiment of the present invention, propylene glycol methyl ether acetate, or an organic solvent mixture consisting of propylene glycol methyl ether acetate and other organic solvents is used as the organic solvent. Other organic solvents that can be used together with propylene glycol methyl ether acetate are preferably those ones selected from the group consisting of propylene glycol-based, ethylene glycol-based, lactate-based, butyrate-based, acetate-based, formate-based and γ-butyrolactone solvents, and mixtures thereof.

The amount of the organic solvent to be used may be properly varied depending upon the concentration of the polymer, crosslinking agent and other additives (excluding the solvent) in the coating composition. For example, the organic solvent is added in an amount of approximately 45 to 95% by weight of the coating composition. Other additives herein include adhesion enhancers, surface-active agents, antioxidants, thickeners, reaction accelerators, and ultraviolet absorbers.

(D) Amino-Containing Silane Coupling Agent

The coating composition of the present invention comprises a specific amino-containing silane coupling agent. This amino-containing silane coupling agent is represented by the following general formula (I):

wherein, $R^1$ is an unsubstituted alkylene group, and $R^2$'s are independently an unsubstituted alkyl group.

Any unsubstituted alkylene group and alkyl group may be selected for $R^1$ and three $R^2$'s, respectively, as long as the resulting silane coupling agent does not mar the effects of the present invention. It is however preferable that the $R^1$ group and the three $R^2$ groups independently contain 1 to 4 carbon atoms. It is particularly preferable that $R^1$ be trimethylene group and that three $R^2$'s be methyl or ethyl group. Namely, the amino-containing silane coupling agent is preferably at least one compound selected from the group consisting of 3-aminopropyl triethoxysilane and 3-aminopropyl trimethoxysilane.

In the coating composition of the present invention, either one of or two or more of the above-described compounds (I) can be used as the amino-containing silane coupling agent.

It is preferable to add the amino-containing silane coupling agent in an amount of 0.1% by weight or more, particularly 0.5 to 3% by weight of the previously mentioned polymer component (A).

Formation of Protective Film

Examples of substrates to which the coating compositions according to the present invention can be applied include color filters, glass substrates, glass filters, and black matrixes. These substrates may be subjected to surface treatment (e.g., ITO deposition, etc.) before the coating compositions of the invention are applied to them. Furthermore, these substrates may be made from a variety of polymers (polyimide, polyamide, polyethylene, acrylic resins, etc.), indium titanium oxide, silicon nitride, metallic oxides (titanium oxide, silicon oxide, chrome oxide, etc.), glass, metals (aluminum, copper, etc.), or the like. It is noted that substrates to which the coating compositions of the present invention can be applied are not limited to the above-enumerated ones.

Substrates coated with protective films by the use of the coating compositions of the invention can be used for semiconductors, flat panel displays and electronic equipment, and their use is not limited only to these devices and equipment.

To form the protective films, the coating compositions according to the present invention are applied to the above-described substrates, and then cured by the application of heat.

Any coating method can be adopted to apply the coating compositions of the invention; and a spin, roll or spray coating method, for instance, can be employed. A spin coating method is, above all, useful for the formation of uniform films.

The conditions under which the coating composition applied is cured may properly be established by taking the type of the polymer used in the coating composition, the composition of the coating composition, etc. into consideration. In general, however, the coating composition applied cures at a temperature of 150 to 270° C. within a time period of about 20 minutes to 10 hours.

EXAMPLES

The present invention will now be explained more specifically by referring to the following examples. However, the present invention is not limited to these examples in any way.

Preparation of Coating Compositions

Coating compositions consisting of the following components were prepared.

|  | Ex. 1 | Ex. 2 | Comp. Ex. 1 | Comp. Ex. 2 |
|---|---|---|---|---|
| Polymer*1 | 14% | 14% | 14% | 14% |
| Crosslinking Agent VG3101L*2 | 4.2% | 4.2% | 4.2% | 4.2% |
| Surface-Active Agent R08*3 | 0.056% | 0.056% | 0.056% | 0.056% |
| Coupling Agent S330*4 | 0.14% | — | — | — |
| Coupling Agent S360*5 | — | 0.14% | — | — |
| Coupling Agent S510* | — | — | 0.14% | — |
| Solvent PGMEA*7 | up to 100% | up to 100% | up to 100% | up to 100% |

*1 A polymer whose monomer components are methacrylic acid (14%), 2-hydroxypropyl methacrylate (20%), methyl methacrylate (60%), and n-butyl acrylate (6%). Molecular weight as calculated in terms of styrene: 40,000; acid value KOH: 150; and glass transition temperature: 81° C.
*2 A crosslinking agent ("TECMORE VG3101L") manufactured by Mitsui Chemicals Inc., Japan, having an epoxy equivalent of 212 g.
*3 A surface-active agent (perfluoroalkyl-group-containing oligomer) manufactured by Dainippon Ink & Chemical, Inc., Japan.
*4 3-Aminopropyl triethoxysilane manufactured by Chisso Corporation, Japan.
*5 3-Aminopropyl trimethoxysilane manufactured by Chisso Corporation, Japan.
*6 3-Glycidoxypropyl trimethoxysilane manufactured by Chisso Corporation, Japan.
*7 Propylene glycol methyl ether acetate.

Formation of Protective Films

Using a spin coater (type IH-DX2, manufactured by Mikasa Kabushiki Kaisha, Japan), a substrate (a glass substrate, color filter or black matrix) was spin-coated with each one of the above obtained coating compositions at a rotational speed of 700 rpm for 30 seconds, and then placed, for post baking, in an oven at a temperature of 250° C. for 30 minutes.

Test for Evaluating the Adhesion Properties of Protective Films

The above-obtained substrates with protective films were placed in a constant-temperature (80° C.) high-humidity (95 RH %) bath for 100 hours. The substrates were then withdrawn from the bath, and 1-mm square notches were made on the surfaces of the protective films with a cutter knife. A cellophane tape was applied to each of these notched surfaces. After 1 minute, the cellophane tape was peeled off without making pause, and the protective films were microscopically observed in terms of their state of adhesion to the substrates. The results obtained were as shown in the table below.

TABLE

| Type of Substrate | Ex. 1 | Ex. 2 | Comp. Ex. 1 | Comp. Ex. 2 |
|---|---|---|---|---|
| Glass | ○ | ○ | x | xx |
| Color Filter | ○ | ○ | Δ | xx |
| Black Matrix | ○ | ○ | Δ | xx |

○: Peeling of the protective film is not observed.
Δ: Peeling of the protective film is slightly observed.
x: Peeling of the protective film is observed.
xx: Peeling of the protective film is remarkably observed.

What is claimed is:

1. A coating composition comprising:
   (A) at least one polymer containing carboxyl group, having a weight-average molecular weight, as calculated in terms of styrene, of 5,000 to 200,000, an acid value of from 10 to 300 mgKOH/g, and a glass transition temperature of 50 to 250° C.;

(B) as a crosslinking agent, a multifunctional epoxide-containing compound having at least one benzene ring or heterocycle, and two or more epoxy groups;

(C) an organic solvent; and (D) at least one amino-containing silane coupling agent represented by the following general formula (I):

wherein, $R^1$ is an unsubstituted alkylene group, and $R^2$'s are independently an unsubstituted alkyl group.

2. The coating composition according to claim 1, wherein the polymer is a copolymer of acrylic acid or esters thereof or methacrylic acid or esters thereof with an aromatic vinyl compound.

3. The coating composition according to claim 1, wherein the epoxide-containing compound has three or more epoxy groups.

4. The coating composition according to claim 1, wherein the organic solvent is selected from the group consisting of propylene glycol-based, ethylene glycol-based, lactate-based, butyrate-based, acetate-based, formate-based and γ-butyrolactone solvents, and mixtures thereof.

5. The coating composition according to claim 1, wherein the $R^1$ group and the three $R^2$ groups contain 1 to 4 carbon atoms independently.

6. The coating composition according to claim 1, wherein the amino-containing silane coupling agent is at least one compound selected from the group consisting of 3-aminopropyl triethoxysilane and 3-aminopropyl trimethoxysilane.

7. A substrate coated with a coating composition set forth in claim 1.

8. A process for forming a protective film, comprising applying a coating composition set forth in claim 1 to a substrate to form thereon a protective film.

* * * * *